March 4, 1958  E. A. STALKER  2,825,794
PROCESS AND APPARATUS FOR FABRICATING HOLLOW BLADES FOR
COMPRESSORS, TURBINES, AND THE LIKE
Filed Feb. 23, 1955
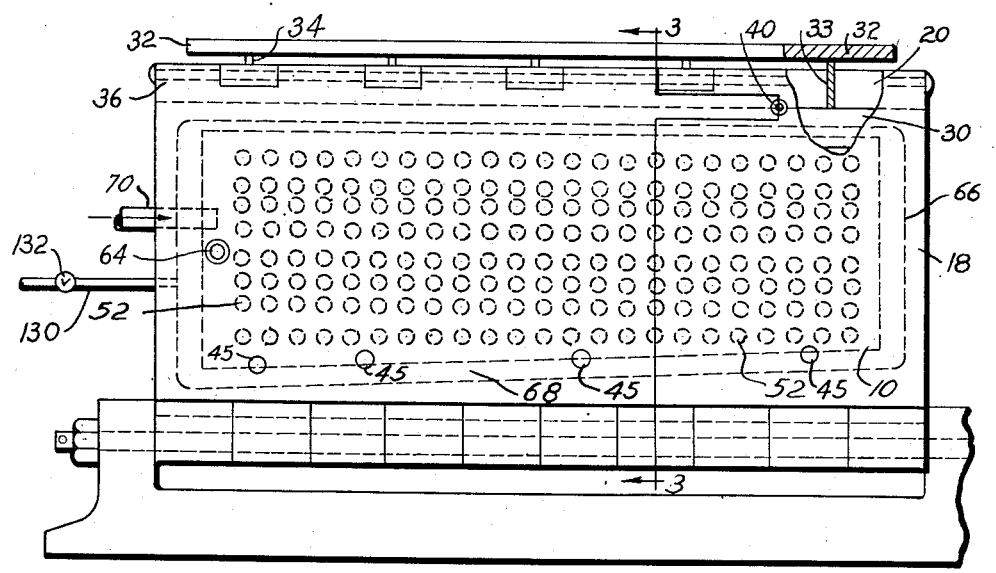
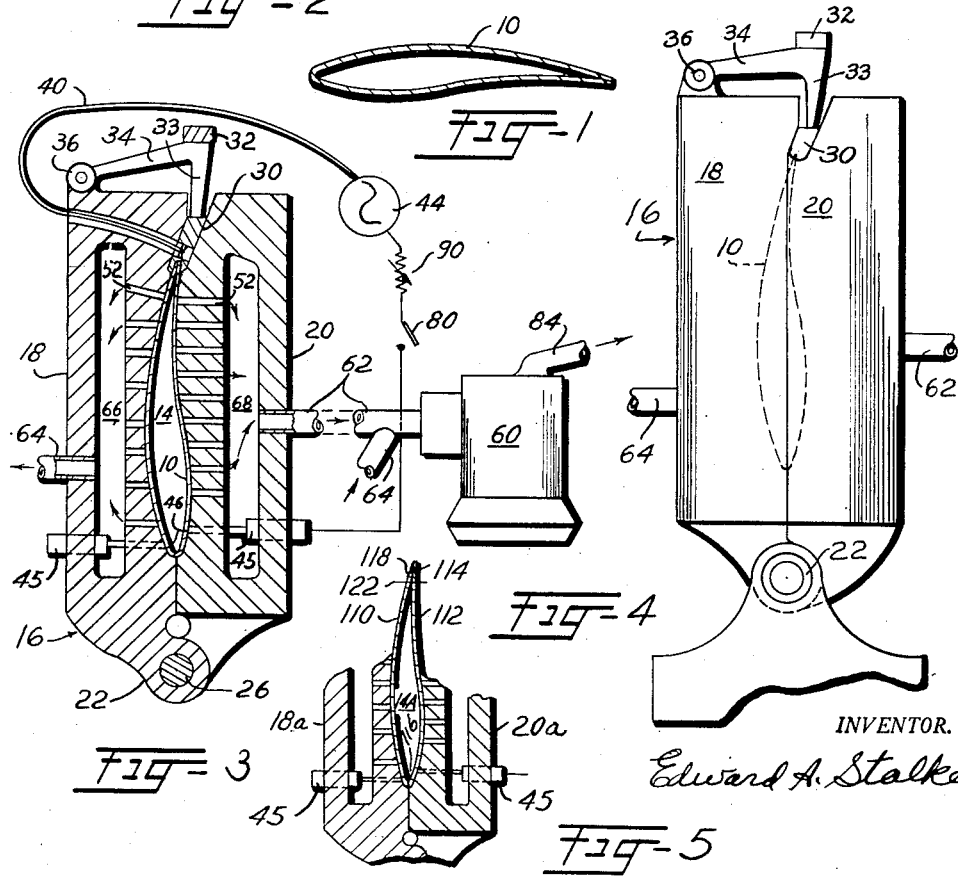
INVENTOR.
Edward A. Stalker

United States Patent Office 2,825,794
Patented Mar. 4, 1958

2,825,794

PROCESS AND APPARATUS FOR FABRICATING HOLLOW BLADES FOR COMPRESSORS, TURBINES, AND THE LIKE

Edward A. Stalker, Bay City, Mich.

Application February 23, 1955, Serial No. 489,944

5 Claims. (Cl. 219—149)

This invention relates to hollow blades for compressors, turbines and the like.

An object of this invention is to provide a process for producing hollow blades for precise contours from sheet stock and the like.

Another object is to provide means of salvaging hollow fabricated blades which are dimensionally incorrect.

A further object is to provide apparatus for so producing hollow blades of this character.

Other objects will appear from the following description, appended drawings, and claims.

In fabricating hollow blades very great accuracies of the blade section contours are sometimes desired. Also processes for fabricating hollow blades usually result in the discarding of a certain number of blades because of minor dimensional departures from the acceptable standards.

It is desirable to provide means of bringing the blade contours to precise dimensions after they have been produced either as a sizing operation in regular production or as a salvaging operation.

In fabricating blades of sheet metal, the variation in the thickness of the sheet stock is a source of variation in the contours of the blades. In the present invention the blades are fabricated in such a manner that the variation in stock thickness does not significantly change the blade contours.

The above objects are accomplished by the means illustrated in the drawings in which—

Fig. 1 is an end view of a blade;

Fig. 2 is a side elevation of the machine for dimensioning blades;

Fig. 3 is a section on line 3—3 in Fig. 2;

Fig. 4 is an end view of the machine of Fig. 2; and

Fig. 5 is a fragment of a section similar to that of Fig. 3 but adapted to a blade made of separate parts.

Referring now to the drawings, Fig. 1 shows the cross section of a blade 10 which has been made by a process resulting in some departures from selected dimensions. That is, its contours lie outside the acceptable tolerances.

The blade is brought within the tolerances on dimensions by a further operation. The blade is placed in the cavity 14 of the machine 16. The two die parts 18 and 20 of the machine swing apart about hinge 22, Figs. 2 and 3, to permit the insertion of the blade. When the die parts are swung closed the blade is positioned in the cavity as shown particularly in Figs. 3 and 4.

An electrode 30, Figs. 2 and 3, is pressed against the rear edge of the blade by the weight 32 acting on the nose piece 33 having crank 34 which is hinge supported at 36. The cable 40 is attached to the electrode 30 and to a source of electric current 44. Other electrodes 45 are pressed against the blade at 46 and are connected to the same source of current 44 to complete the electrical circuit through the blade. The electrodes are suitably insulated from the dies so that the heating current will be confined to the blade.

The electrode 30 preferably extends along the full length of the blade and is free to slide inward for a limited distance to exert a pressure on the blade walls.

The inner surfaces of the cavity have a plurality of holes 52, Figs. 2 and 3, in communication with a source of suction 60 by way of pipes 62 and 64 and the chambers 66 and 68.

Atmospheric or other fluid pressure reaches the interior of the blade 10 through the duct 70, Fig. 2, leading into the blade interior. The die parts 18 and 20 close upon each other as shown in Fig. 4, forming a closure which acts to block a sudden flow of air so that a strong inflow through duct 70 will build up an effective internal pressure leaving the blade free of outside connections.

The blade 10 in its initial condition upon being inserted into the machine will not contact the surfaces of the cavity at all points since its contours are not precisely the selected blade contours, which are also the contours of the cavity.

To confer on the blade 10 the selected contours, it is heated by a current passing through the blade when the switch 80 is closed. The walls of the blade are also subjected to suction acting through the holes 52 and provided by the source of suction 60 which is preferably a suction pump. The pump discharges through the discharge pipe 84.

The blades are preferably heated to about red heat while the suction is being applied. It forces the blade walls against the surfaces of the cavity so that they take on the selected contours. After the walls are properly heated the current is shut off but the suction is maintained until the walls have cooled. This insures that they will retain the selected contours.

Preferably the blade walls are cooled gradually by decreasing the current gradually by means of the rheostat 90.

In this means of conditioning the blades, they are heated independently of the dies. They are also heated rapidly by a large current flow so that the dies absorb a minimum amount of heat. They are always at a sufficiently low temperature that they last a very long time without exceeding the tolerance required to produce satisfactory blades.

The apparatus and process described is particularly useful in salvaging blades which have been made by a precise process normally producing blades of the selected contour. In any such process however there are apt to be blades which are not precise due to accident, carelessness on the part of workmen and other conditions which intrude unnoticed until a number of blades have been made which will not meet the tolerances specified for the blade dimensions. It is important to salvage these blades.

The process and apparatus described is also useful as a means of producing precise blades of a selected contour where the initial steps of fabrication are not sufficiently precise.

As shown in Fig. 5 a blade may be made in two parts 110 and 112. These are fixed together by spot welds 114 spaced along the blade span which is the dimension of the blade extending perpendicular to the section shown in Fig. 5.

Brazing paste is placed at the joints 116 and 118 at the leading and trailing edges respectively. When melted this will flow into the joints by capillary action.

After brazing of the parts together the excess trailing edge portion is cut off at 122.

The blade parts are held between the surfaces of the cavity 14A of the same character as 14. That is, the surfaces of the cavity have substantially the contours selected for the blade.

During the brazing operation the blade parts are heated by currents from the source 44 through the circuit shown in Fig. 3. Simultaneously the suction pump draws the blade walls against the surfaces of the cavity. As the current is reduced the walls cool and set to the selected contours while subject to the suction or fluid pressure. The dies 18a and 20a are then swung apart and the blade is removed.

The blades have walls which are thin relative to the maximum thickness of the blade section. That is, the wall thicknesses are each less than one-quarter of the maximum thickness and preferably less than 10 percent of the maximum thickness.

The blades are preferably made from sheet stock although they may be made by any other process including those beginning with a tube.

The blades may be heated to any relatively high temperature that significantly increases the yieldability of the material. For most steels a satisfactory temperature is that corresponding to red heat. Where brazing is also to be accomplished the temperature corresponds to a somewhat higher temperature than the melting point of the solder.

The rapidity of cooling the blade can be increased by opening valve 130 in tube 132 in communication with the interior of the cavity. This will permit a circulation of air or other fluid through the blade interior from duct 70 to tube 132. This same circuit may also be used to cool the dies after the blade is removed.

The process described can also be used to form the separate walls of a blade.

The walls may also be heated by electric currents produced inductively in the walls.

While I have illustrated specific forms of the invention, it is to be understood that variations may be made therein and that I intend to claim my invention broadly as indicated by the appended claims.

I claim:
1. The process of completing the fabrication of a precisely contoured fluid deflecting blade for compressors, turbines and the like from upper and lower blade walls of sheet metal preformed to substantially proper contours and comprising juxtaposing said contoured upper and lower blade walls, securing said walls together along edge lengths thereof forming a hollow blade assembly with said upper and lower blade walls generally opposite and spaced from each other, placing the blade assembly in the cavity of a machine with the interior of said assembly open to fluid pressure, said cavity having apertured surfaces thereof on opposite sides corresponding precisely to selected airfoil contours for said upper and lower blade surfaces, heating the blade to a high temperature, reducing the effective pressure on said apertured surfaces to force both said blade walls against said surfaces with the difference in fluid pressure between the interior and exterior of said blade being the sole deforming force acting in pressure forming relation thereto, and cooling said blade assembly while in said cavity and subject to said pressure to confer on the walls thereof substantially said selected contours.

2. The process of completing the fabrication of a precisely contoured fluid deflecting blade for compressors, turbines and the like from upper and lower blade walls of sheet metal preformed to substantially proper contours comprising juxtaposing said contoured upper and lower blade walls, securing said walls together along opposite edges thereof forming a hollow blade assembly with the ends thereof open, placing the blade assembly in the cavity of a machine with the interior of said assembly open to fluid pressure, said cavity having apertured surfaces thereof corresponding precisely to selected blade contours, heating the blade to high temperatures independently of said machine, applying a chordwise force to an edge of said blade and applying reduced fluid pressure to the exterior walls of the blade assembly through said apertured surfaces of said cavity with the difference in fluid pressure between the interior and exterior of said blade being the sole force to hold said walls against said surfaces, and cooling said blade assembly in said recess while subject to said pressure to set the blade material to said blade contours.

3. Apparatus for precisely contouring the walls of a hollow metal blade of selected blade section contours for compressors, turbines and the like comprising a die assembly having a die cavity whose surfaces conform precisely to said selected blade contours, said die assembly being constructed to receive a hollow blade element into said die cavity, said walls of said blade element when in said cavity terminating within the confines of said die assembly, said hollow blade element terminating in an open end of a blade section contour, means secured to said die assembly in communication with said cavity adjacent said open end of said blade element to transmit fluid pressure into said cavity and into the interior of said element, said die assembly supporting said blade element relative to said pressure transmitting means for the transference within said cavity of fluid pressure into the interior of said blade element through said open end in an amount substantially in excess of the surrounding blade pressure effective on the exterior surface of said blade to stretch the walls of said element into conformance with the contours of said cavity under the action of said pressure difference alone to form said accurately contoured hollow blade.

4. The process of forming a precisely contoured fluid deflecting blade for compressors, turbines and the like from upper and lower blade walls preformed to substantially proper contours which comprises bringing said preformed upper and lower blade walls together to form a hollow blade assembly, fusing said walls together along mating edges thereof, placing said blade assembly in the cavity of a machine with the interior of said assembly open to fluid pressure, said cavity having surfaces shaped to correspond with the selected blade contours on both said upper and lower walls, heating said blades to increase the yieldability of the material thereof, applying a substantially greater fluid pressure to the interior of said hollow assembly than on the exterior of said blade walls to develop a force from said pressure difference alone serving to stretch said upper and lower blade walls into close contact with the surfaces of said cavity, and cooling said blade assembly in said cavity to set the blade material to said precise blade contours.

5. The process of forming a precisely contoured fluid deflecting blade for compressors, turbines and the like from upper and lower blade walls preformed to substantially proper contours which comprises bringing said preformed upper and lower blade walls together to form a hollow blade assembly, fusing said walls together along mating edges thereof leaving said assembly open at opposite spanwise ends, placing said blade assembly in the cavity of a machine with the interior of said assembly having a connection in spaced relation to said blade walls to receive fluid pressure while restricting the flow from said ends, said cavity having surfaces shaped to correspond with the selected blade contours on both said upper and lower walls, and applying a substantially greater fluid pressure to the interior of said hollow assembly than on the exterior of said blade walls to develop a force from said pressure difference as the sole force serving to deform said blade walls into close contact with the surfaces of said cavity to set the blade material to said precise blade contours.

References Cited in the file of this patent
UNITED STATES PATENTS

| | | |
|---|---|---|
| 1,252,144 | Murray et al. | Jan. 1, 1918 |
| 1,501,023 | Goodspeed | July 8, 1924 |
| 2,222,762 | Debor et al. | Nov. 26, 1940 |
| 2,517,701 | Oettinger | Aug. 8, 1950 |
| 2,577,336 | Lampton | Dec. 4, 1951 |